March 22, 1966  J. S. ZUCKERBRAUN  3,242,343
OSCILLATING REED SCANNER WITH TWO EXCURSIONS
AND APERTURE WITH CENTRAL OPAQUE REGION
Filed Dec. 11, 1961  2 Sheets-Sheet 1

INVENTOR.
JACOB S. ZUCKERBRAUN

BY
OSTROLENK, FABER, GERB & SOFFEN

ATTORNEYS

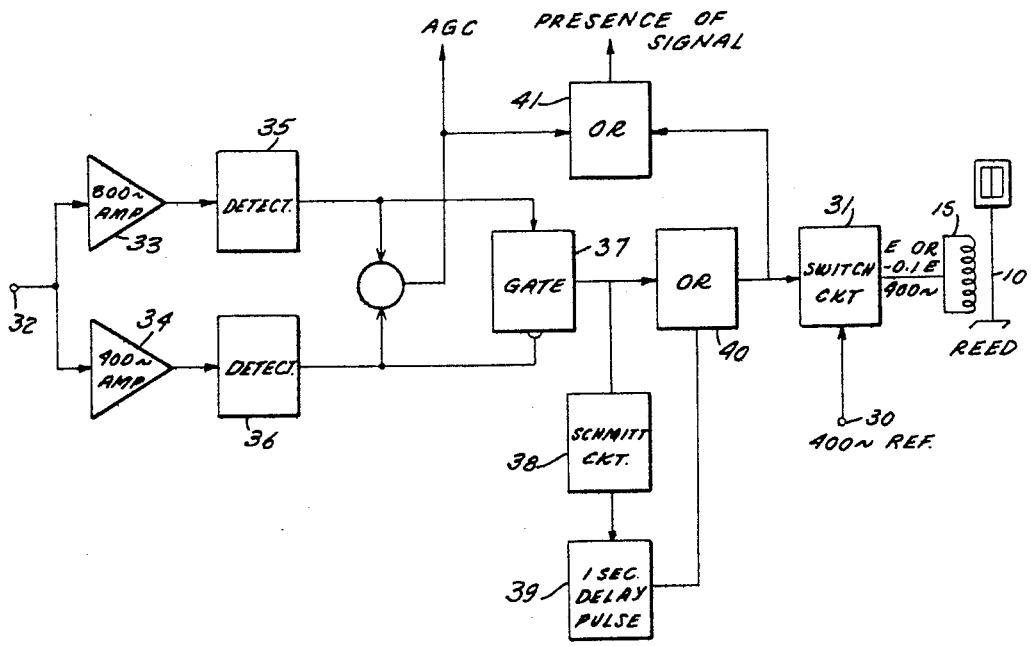
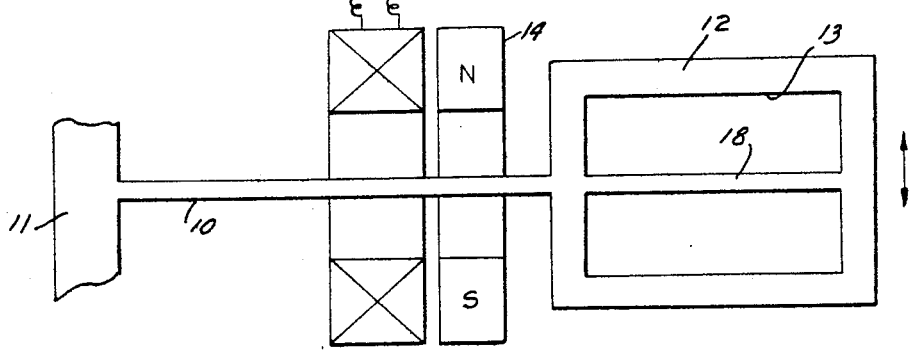

United States Patent Office 3,242,343
Patented Mar. 22, 1966

3,242,343
OSCILLATING REED SCANNER WITH TWO EXCURSIONS AND APERTURE WITH CENTRAL OPAQUE REGION
Jacob S. Zuckerbraun, New York, N.Y., assignor to Kollsman Instrument Corporation, Elmhurst, N.Y., a corporation of New York
Filed Dec. 11, 1961, Ser. No. 158,336
2 Claims. (Cl. 250—232)

My invention relates to a novel high accuracy scanner for light modulation systems, and more specifically relates to a dual-field reed scanner wherein the aperture contained within a scanning reed has an opaque line therein for small excursion high accuracy scanning after an approximate null position is achieved.

Light scanning systems, or light modulation systems for light tracking devices, are well known in the art, and are shown, for example, in United States Patent No. 2,905,828 to O'Maley et al., entitled "Light Tracking Device," and assigned to the assignee of the present invention.

A specific scanning system using a vibrating reed which carries a plate having an aperture therein, which aperture is vibrated in front of the star image, is set forth in my copending application Serial No. 47,837, filed Aug. 8, 1960, entitled "Light Modulation System," and assigned to the assignee of the present invention. The vibrating reed can be replaced by a tuning fork, as is set forth in my copending application Serial No. 71,248, now Patent No. 3,178,579, filed Nov. 23, 1960, entitled "Tuning Fork Scanner," and assigned to the assignee of the present invention. In either case, a plate containing the aperture is carried on the vibrating element.

The present invention is directed to an improvement in such scanners having a plate having an aperture therein which is vibrated to modulate the image of the source of radiation being tracked. Generally, in these systems, when the image of the star falls in the center of the sweep of the vibrating aperture, a signal is developed in photosensing means contained behind the aperture, which is at twice the frequency of the vibration of the aperture. As the star image moves off the null position (and along the line if vibration), a signal is developed in the photosensing means which is at the same frequency as the frequency of vibration of the aperture. The phase of this frequency contains information as to the direction in which the image has moved from the null position, whereby appropriate servo means can be utilized to maintain a maximum double frequency signal and a minor null signal which is at the frequency of vibration.

I have found that the output error signal (fundamental frequency signal) from a photo-sensing system decreases approximately linearly to zero as the null position is approached. Since the noise level remains constant, a point is reached near the null position where the signal level falls below that of the noise level. Thus, there will be a small region around the null position where tracking errors can occur.

In order to improve the accuracy of the reed scanner type device, I have found that I can place a small opaque line in the center of the aperture. As the null position is reached, the excursion of the scanning aperture is changed so that the scanning now occurs by the opaque line, rather than by the aperture. This will then give a considerable reduction in tracking error with the null signal again occurring at twice the reed frequency, but where a unity signal-to-noise signal ratio is achieved at a considerably decreased angle.

Accordingly, a primary object of this invention is to provide a high accuracy scanning system for measuring the position of a source of radiation.

Another object of this invention is to improve the accuracy of a vibrating-type scanning system.

A further object of this invention is to place an opaque line in the center of a sweeping aperture, which opaque line is used to sweep when the system is in the immediate vicinity of a null position.

A further object of this invention is to provide a novel scanning system for light tracking systems wherein an opaque line contained within a scanning aperture carried by a reed scans through a relatively small excursion in the null position region.

These and other objects of my invention will become apparent from the following description when taken in connection with the drawings, in which:

FIGURE 2 illustrates the manner in which the standard reed having an aperture plate thereon is modified in accordance with the present invention.

FIGURE 3 illustrates a block diagram to indicate the manner in which the reed of FIGURE 2 may be controlled.

Figure 1:
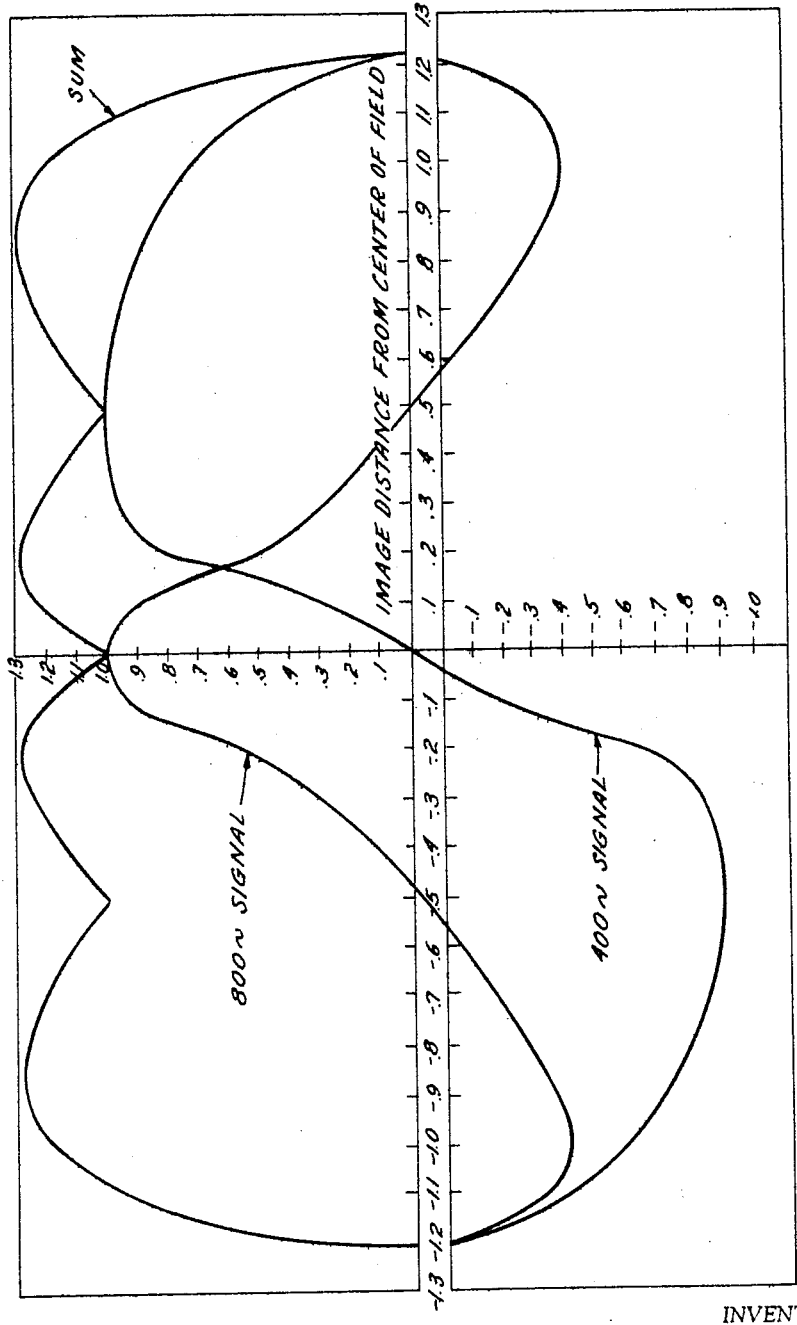
FIGURE 1 illustrates the output signals of a typical aperture-type scanner.

Referring first to FIGURE 1, I have illustrated therein the output of a vibrating slot aperture of a scanning system constructed in accordance with my above noted application Serial No. 47,837.

In the analysis of FIGURE 1, the width of the slot is taken as unity, and the field swept in the direction of the vibration of the aperture is 2.41 units. The frequency of vibration of the reed was 400 cycles so that, depending upon the image distance from the center of the field, the 800 cycle signal varies from a maximum of 1 at the null position. The 400 cycle signal, which depends, in magnitude, on the excursion of the image center from the center of the area swept, is seen to vary approximately linearly in a range of plus or minus 0.25 image distances from the center of the field. Because the noise level remains constant, it will be seen that a point will be reached near the null position or the position of zero image distance from the center of the field where the signal level falls below that of the noise. Thus, there will be a small region around this null position where tracking errors can occur.

As an example, and where a field of 2° is swept, where the 2.41 units corresponds to 120 minutes, at unity signal level, the signal-to-noise ratio is 100. The slope of the error characteristic near null will be $$G = \frac{1}{900}$$

Thus, the angular error at which unity signal-to-noise occurs is $$\theta = 900 \times 10^{-2} = \pm 9 \text{ seconds}$$

To decrease this error, I have found that I can place an opaque line in the center of the aperture which is used to scan with reduced excursion when the system is in the region of the null.

FIGURE 2 illustrates one manner in which the reed may be constructed in accordance with this concept. Thus, in FIGURE 2, a thin reed 10 mounted on a base 11 has a plate 12 at its right-hand end. The plate 12 has an aperture 13 therein where this aperture is normally used in scanning the light source image. The plate 12 and reed 10 are driven by a driving system which could, for example, include a permanent magnet bias 14 and an electromagnetic coil 15 which has terminals 16 and 17.

The terminals 16 and 17 are connected to a voltage source of, for example, 400 cycles which would then cause the reed 10 to oscillate at a frequency of 400 cycles in view of the interaction between the magnetic field from coil 15 and the magnetic field of coil 14 within the magnetic reed body 10. To this extent, the construction of the reed and aperture plate in FIGURE 2 may be identical to that of my copending application Serial No. 47,837 mentioned above.

In accordance with the present invention, however, a narrow opaque section 18 is placed in the center of aperture 13. During the initial search and acquisition phase, the reed will vibrate with full amplitude to sweep out a relatively wide field of, for example, 2°. The opaque line 18, which is small in comparison with the full slot width, will have a minor effect on the error signal during this phase of the operation. Thus, a star will be tracked in the usual manner to an approximate null position. Once an approximate null position is reached, however, the double frequency signal, such as the 800 cycle signal of FIGURE 1, will be near its maximum, while the fundamental or error signal will be near zero.

Under these conditions, and in accordance with the present invention, the excitation to the reed from coil 15 is automatically reduced to a relatively low level whereby optimum scanning proceeds by means of the narrow opaque line 18 in plate 12. Since the fine scanning is now achieved by opaque rather than a clear area, the phase of the reed drive-current is reversed when the amplitude is reduced so that continuous sweeping is achieved. Alternatively, the reed amplitude could be reduced as required, but instead of reversing the phase of the reed, the phase of the motor reference winding or the error demodulator could be reversed.

In operation, and assuming that when sweeping occurs by the opaque line, a field of 12 minutes can be swept where the width of the line may be of the order of 5 minutes of field. The unity signal-to-noise ratio will then occur at approximately 0.9 second, thus giving a tenfold reduction in tracking error. Clearly, the null signal will occur at twice the reed frequency as where the sweeping occurs by the aperture 13 alone.

If, for some reason, the star is lost during the fine tracking mode of operation, simple logic circuitry can be caused to reset the whole system and cause the reed to scan in its acquisition mode.

Where the device is applied to systems where several seconds of tracking error is permissible, the narrow field line may be desirable to permit reduction in the dimensions of the telescope which generates the star image at the scanning aperture and gimbal mechanism supporting the telescope. Moreover, the reed of FIGURE 2 can, of course, be applied to any system such as the crossed reed configuration of my copending application Serial No. 47,837, or further, for example, in the system of my copending application Serial No. 111,745, filed May 22, 1961, entitled "Scanning Device for Light Tracking Systems," and assigned to the assignee of the present invention.

FIGURE 3 schematically illustrates, in block diagram, the circuitry that may be used with the novel dual-field scanner. In FIGURE 3, the reed 10 of FIGURE 2 is seen to be driven by the schematically illustrated coil 15 where the voltage applied to the coil can be either the voltage E or $-0.1E$. The voltage E is applied when the reed 10 is operated in the acquisition mode, while potential $-0.1E$ is applied when the reed 10 is in its fine scanning mode near the null position of the system. The $-0.1E$ will also reverse the phase of vibration of reed 10, as required when going to the fine scanning mode.

The power for coil 15 is obtained from a 400 cycle source schematically illustrated at terminal 30 which is connected to a switching circuit 31 which applies either the E or $-0.1E$ to coil 15.

The remaining circuitry is utilized in part for controlling the operation of switching circuit means 31. The output signal of the photosensitive means associated with reed 10 and scanning aperture plate 12 is applied to input terminal 32. The terminal 32 is connected to an 800 cycle amplifier 33 and a 400 cycle amplifier 34 which are, in turn, connected to detection circuits 35 and 36 respectively.

When the double frequency signal from amplifier 33 approaches a maximum, while the fundamental or error signal from amplifier 34 approaches a minimum, the star has been tracked to an approximate null position, and it is now necessary that the switching circuit 31 be operated to the accurate tracking mode. When these conditions are reached, the gate circuit 37 is operated to appropriately operate a Schmitt circuit 38 which energizes a pulsing circuit 39 which has a one second delay to permit reed 10 to reverse phase. The pulsing circuit 39 operates an OR circuit 40, which operates the switching circuit 31 for the fine tracking mode. In addition, the OR circuit 40 turns on the OR circuit 41 when, in conjunction with the compared output of detectors 35 and 36, a sufficient difference occurs to cause a presence of signal operation through OR circuit 41 to other required circuitry for the system.

In operation, if the star is not within the narrow field, gate 37 is inhibited because of the presence of an output from detector 36. Therefore, there will be no output from OR circuit 40. The output from switching means 31 will remain at E, and the reed is driven at full amplitude.

When the star is brought near null, the output of detector 36 can no longer inhibit gate circuit 37. An output then appears from OR circuit 40 which causes switching means 31 to deliver $-0.1E$. At the same, the Schmitt is triggered and causes a 1 second pulse to be delivered to OR circuit 40 so as to maintain the new reed voltage at $-0.1E$ during the reed transient.

Note that while the reed undergoes its transient motion the developed star signals may become small or even zero, because the reed amplitude is not optimum for either the narrow or wide field.

Consequently, it is necessary to have an artificial presence signal. This is obtained from OR circuit 40 which in turn is receiving its signal from the 1 second delay pulse.

When the reed transient disappears and the star is at null, either the output of gate 37 operating through the OR circuit 40, or the AGC signal (as determined by circuit 41), causes the presence signal to appear at the output of circuit 41.

If the star is moved off null, the 400 cycle signal will reappear inhibiting gate 37, and causing the output of OR circuit 40 to become zero. However, the AGC signal does not disappear immediately because of its time constant. Consequently a presence output remains at circuit 41 during the reed transient build up. After build up, the AGC continues to maintain a presence indication.

The other essential function of the AGC signal is to control the phototube gain so that the vertical scale factor of FIGURE 1 is constant independent of star magnitude.

Although this invention has been described with respect to its preferred embodiments, it should be understood that many variations and modifications will now be obvious to those skilled in the art, and it is preferred, therefore, that the scope of this invention be limited not by the specific disclosure herein but only by the appended claims.

I claim:

1. A scanning mechanism for light tracking devices; said scanning mechanism comprising an oscillating reed having an aperture therein and means for oscillating said aperture with respect to the image of a light source to be tracked; said aperture having a central opaque region for fine tracking; said means for oscillating said aperture including means for providing relatively wide excursion of said aperture and means for providing relatively small excursion of said aperture; said aperture having a relatively wide excursion for rough positioning operation with use of said aperture; said aperture having a relatively small excursion for fine positioning operation with use of said central opaque region; said opaque region covering an area substantially smaller than the area of said aperture.

2. A scanning mechanism for light tracking devices; said scanning mechanism comprising an oscillating reed having an aperture therein and means for oscillating said aperture with respect to the image of a light source to be tracked; said aperture having a central opaque region for fine tracking; said means for oscillating said aperture including means for providing relatively wide excursion of said aperture and means for providing relatively small excursion of said aperture; said aperture having a relatively wide excursion for rough positioning operation with use of said aperture; said aperture having a relatively small excursion for fine positioning operation with use of said central opaque region; said scanning mechanism including means for reversing the phase of said excursion of said aperture when going from scanning with said aperture to scanning with said opaque region to permit continuous scanning; said opaque region covering an area substantially smaller than the area of said aperture.

References Cited by the Examiner

UNITED STATES PATENTS

| | | | |
|---|---|---|---|
| 2,494,607 | 1/1950 | Bouchet | 250—232 X |
| 2,720,810 | 10/1955 | Senn | 250—237 X |
| 2,923,202 | 2/1960 | Trimble | 250—203 X |
| 2,965,762 | 12/1960 | Turck | 250—203 |
| 3,005,374 | 10/1961 | Thomas | 250—232 X |
| 3,012,148 | 12/1961 | Snyder et al. | 250—83.3 |
| 3,110,812 | 11/1963 | Hulett et al. | 250—203 |

RALPH G. NILSON, *Primary Examiner.*

WALTER STOLWEIN, *Examiner.*